(12) United States Patent
Neal

(10) Patent No.: US 6,703,104 B1
(45) Date of Patent: Mar. 9, 2004

(54) PANEL CONFIGURATION COMPOSITE ARMOR

(76) Inventor: Murray L. Neal, 681 E. Brighton La., Fresno, CA (US) 93720

( * ) Notice: Subject to any disclaimer, the term of this patent is extended or adjusted under 35 U.S.C. 154(b) by 0 days.

(21) Appl. No.: 10/039,504

(22) Filed: Jan. 4, 2002

(51) Int. Cl.[7] .................................................. B32B 3/12
(52) U.S. Cl. ........................ 428/118; 428/73; 428/116; 428/911; 428/920; 428/921; 89/36.11; 89/36.04; 89/36.02; 156/285; 156/295; 156/335; 264/258; 264/299; 264/319; 264/328.1
(58) Field of Search ............................ 428/73, 116, 117, 428/118, 911, 920, 921; 442/134, 135, 136, 172, 180; 156/60, 285, 290, 295, 335; 264/241, 257, 258, 299, 319, 328.1; 89/36.01, 36.02, 36.04, 36.11

(56) References Cited

U.S. PATENT DOCUMENTS

| | | | | |
|---|---|---|---|---|
| 4,529,640 A | * | 7/1985 | Brown et al. | |
| 4,923,728 A | * | 5/1990 | Snedeker | |
| 5,200,256 A | * | 4/1993 | Dunbar | |
| 6,305,468 B1 | * | 10/2001 | Broome et al. | |

* cited by examiner

Primary Examiner—Deborah Jones
Assistant Examiner—Wendy Boss
(74) Attorney, Agent, or Firm—Blakely, Sokoloff, Taylor & Zafman LLP

(57) ABSTRACT

A method and apparatus comprising combining ballistic and fragment resistant fabrics in multiple layers with a central geometrically shaped composite core in a resin forming a composite armor panel, wherein the multiple layers present a fragment projectile with alternating tougher and softer resistances to penetration to enhance the stopping power of the composite armor while retaining a lightweight configuration is disclosed. The panel allows the fabric layers and geometric core to interact in such a manner as to function as a drumskin, flexing and elastically deforming to absorb and attenuate the energy of a forced entry attack.

38 Claims, 4 Drawing Sheets

PROVIDING A CENTER LAYER OF A PANEL HAVING A PLURALITY OF CLOSELY PACKED HEXAGONAL CELLS OF A FIRST MATERIAL WHEREIN A MAJOR AXIS OF THE CELLS IS NORMAL TO A PLANE IN WHICH THE FIRST LAYER LIES THE LAYER IMPREGNATED WITH A RESIN
610

ENCASING THE CENTER LAYER IN A FIRST FABRIC LAYER HAVING A PLURALITY OF PLIES OF A FIRST FABRIC IN A BALANCED MANNER SO THERE ARE AN EQUAL NUMBER OF PLYS OF THE FIRST FABRIC ON THE FRONT AND BACK OF THE CENTER LAYER, THE FABRIC IMPREGNATED WITH A RESIN
620

ENCASING THE COMBINATION OF THE CENTER LAYER AND THE FIRST FABRIC LAYER IN A SECOND FABRIC LAYER HAVING A PLURALITY OF PLIES OF A SECOND FABRIC BEING DIFFERENT FROM FIRST FABRIC IN A BALANCED MANNER SO THERE ARE AN EQUAL NUMBER OF PLIES OF THE SECOND FABRIC ON THE FRONT AND BACK OF THE CENTER LAYER, THE SECOND FABRIC IMPREGNATED WITH A RESIN
630

PLACING THE PANEL INTO A MOLD
640

PLACING THE MOLD IN AN AUTOCLAVE AND HEATING AND PRESSURIZING THE PANEL UNTIL THE RESIN TURNS INTO A LOW VISCOSITY LIQUID COMBINING WITH THE PLY ABOVE AND BELOW IT AND FORMING A BOND BETWEEN THE PLURALITY OF PLIES AND THE CENTER LAYER AND SEALING THE PANEL FROM THE ENVIRONMENT
650

FIG. 6

PANEL CONFIGURATION COMPOSITE ARMOR

BACKGROUND

1. Field of the Invention

The invention relates to armor. More specifically, the invention relates to fiber reinforced composite armor panels.

2. Background

In recent years, forced entry-resistant materials formed from high tensile strength fibers such as aramid fabrics or polyethylene fabrics combined with structural backing have gone into common use. These forced entry resistant materials typically have the advantages of greater tensile strength and the less weight per unit area then metals. Applications for forced entry resistant materials are found in commercial airlines and maritime vessels especially to separate the crew from the passengers.

High-tensile strength fibers such as, for example, aramid fibers in fabrics have been combined with polymer matrices to form polymer-polymer composite armor. These fiber reinforced polymer matrices benefit from the high-tensile strength of the aramid fabric and high resistance to fracture and fatigue of the polymer matrix. Multiple layers of high tensile strength aramid fabric can be combined with epoxy matrices, and compacted into an armor shield.

Composite armor panels have been designed for use in aircraft, vessels, vehicles and buildings. These composite forced entry attack resistant armor panels have combined polymer-polymer fabric layers with structural members to enhance the capacity of the armor for absorbing and defeating attack from multiple threats. These threats include ballistic, forced entry and explosive blast.

Ballistic threats include but are not limited to handguns of various manufactures and calibers. The National Institute of Justice (NIJ) has established a uniform system of calibrating handgun threats, and the ability of armor to defeat these threats. The highest NIJ standard for handgun threats is Level III-A. The NIJ standard for standard rifle threats is Level III. Some handgun configurations have unusually high velocities and ballistic ability that are closer to rifle abilities. These threats have been labeled with the non-NIJ hybrid designation level III-A+. To meet a specific standard, an armor panel must be able to withstand, without failing, five rounds of a particular caliber within one square foot of armor panel. A level III-A capable armor defeats the following calibers and projectile configurations as an example: 25 caliber Automatic Colt Pistol (.25 ACP), .380 ACP, .38 Special, .45 ACP, 9 millimeter (9 mm) Parabellum, .357 Magnum and .44 Magnum. A level III-A+ capable armor defeats the following calibers and projectile configurations as an example: .50 Action Express, flechette (little steel darts) and a one ounce shotgun slug from a 12 gauge shotgun with a 3 inch chambering.

Forced entry attacks include but are not limited to sustained attacks with hand hatchets, fire axes, hand hammers, sledge hammers, chisels, pipes and bats. These represent the typical blunt and sharp attack implements. The American Society for Testing and Materials (ASTM) has adopted a set of standards for calibrating resistance to forced entry attacks. The standard is called ASTM 1233-93. ASTM 1233-93 sets forth procedures whose purpose is limited to the evaluation of the resistance of security systems against the following threats: ballistic impact, blunt tool impacts, sharp tool impacts, thermal stress and chemical deterioration. Failure is denoted by an opening formed in the armor as a result of the above mentioned attacks sufficiently large to get a hand or an object through, or to allow a whole body transfer. ASTM 1233-93 is broken down into multiple classes and each class is divided into multiple sequences. For example class III contains 16 sequences. Class III begins with sequence 1. A test subject that survives sequence 1 goes on to face sequence 2. This progression continues until all of the sequences in the class have been passed or the subject has failed. An armor panel that can withstand a class III sequence 16 standard represents a varied attack of the above threats for about 30 minutes.

Explosive blast as applied to these armor panels includes overpressure and fragmentation or shrapnel effects. A typical test for explosive blast comprises detonating a United States M-67 anti personnel fragmentation grenade three feet from the armor panel. The M-67 grenade weights about 395 grams has a steel casing and contains about 185 grams of explosive. A detonation of a M-67 grenade at this range will generate an overpressure of about 1 to 2 pounds per square inch plus fragmentation effects. Alternatives to the M-67 grenade include but are not limited to the British L2A2 and the German DM51. The L2A2 weights about 395 grams and contains about 170 grams of explosive. The DM51 weights about 435 grams and contains about 60 grams of explosive. Both the L2A2 and the DM51 have similar explosive characteristics to the M-67.

Another requirement for composite armor panels or doors in aircraft is the heat release standard established by Ohio State University (OSU). The maximum heat release rates and smoke density values required by the Federal Aviation Administration (FAA) are described as "OSU 65/65 200." OSU 65/65 denotes a maximum peak and two-minute integrated total heat release for a material which designers wish to place in a commercial aircraft. The maximum peak heat release value is 65 kilowatt per square meter of object (kW/m$^2$). This means that at any one time the most heat that can be generated by the object is 65 kW/ m$^2$. The standard also has a two minute integrated value of 65 kilowatt-minutes per square meter (kW-m/m$^2$). Appended to the OSU standard is a National Bureau of Standards (NBS) standard for smoke density generation with a specific optical density (Ds) maximum of 200. This standard measures the reduction in visibility caused by smoke generated from an onboard fire.

Federal Aviation Regulation 25.853 regulates the combustibility of a material exposed directly to a flame. A Bunsen burner is substituted for an open flame. The vertical Bunsen burner test method is used for determining the resistance of cabin and cargo compartment materials when tested according to the 12-second or 60-second specified in FAR 25.853. Materials subjected to this test pass or fail based on burn length, after flame time, and drip flame time

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 6 is a flow chart showing one method of fabricating the composite armor.

DETAILED DESCRIPTION

Figure 1:
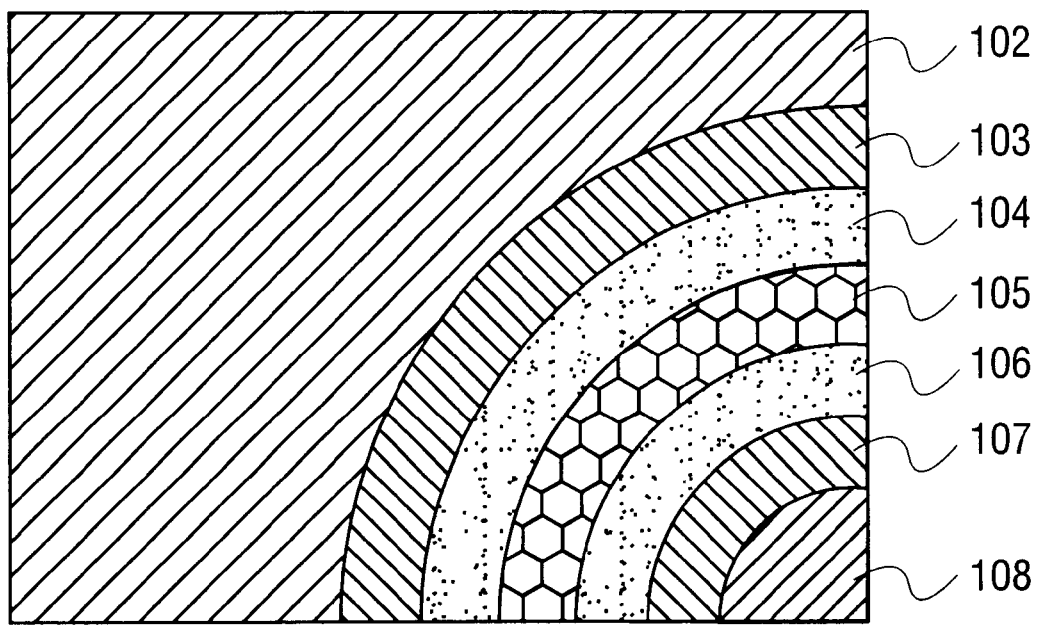
FIG. 1 is a top down cut away schematic view of the one embodiment of the composite armor.

In the following description, for purposes of explanation, numerous specific details are set forth to provide a thorough understanding of the invention. It will be apparent, however, to one of ordinary skill in the art, that the invention may be practiced without some of the specific details mentioned in the description. The following description and accompanying drawings provide examples for the purpose of illustration. However, these examples should not be construed in a limiting sense, as they are merely intended to provide examples of the invention, rather than to provide an exhaustive list of all possible implementations of the invention.

As used herein, a composite armor is defined as an armor made up of at least two distinct phases of material that, when combined together, reinforce each other with their respective desirable physical properties, allowing the composite article to have better physical properties than either single phase has alone. In one embodiment, the composite article is a polymer-polymer composite encasing a structural composite comprising a plurality of closely packed geometric cells and a resin. Polymer fibers are used to reinforce a polymer resin or matrix.

Polymer matrices have high resistance to creep, and crack propagation. Polymer fibers have high tensile strength. A composite armor made of polymer matrix, and polymer fabric reinforcement gains from the benefits of each material and the combination has high resistance to fracture and failure. Fabric reinforcement contributes high tensile strength and resistance to yielding in the presence of a projectile or instrument impact. The polymer matrix contributes a greater toughness and resistance to fatigue, creep, heat and chemical resistance.

In this composite armor panel, the geometric cell core attachment serves two primary functions: it acts as a spacer separating the opposite layers of ballistic fabric for ballistic protection, and acts as reinforcement for forced entry attack. In the event of a ballistic attack the geometric cell core attachment provides a gap between the front layers of fabric armor and the back layers of armor. This gap allows the ballistic projectile some room to continue to tumble or yaw so as to present a larger surface with more area to the final layers of the composite armor. In the event of a forced entry attack the geometric cell core attachment provides flex and an elastic deformation medium for dispersing the energy of a forced entry attack and returning to the original shape of the panel.

In this composite armor, the polymer matrix, or resin, does three things. The resin supports fibers in place, thus transferring stress from one layer of the fibers to the next layer, both within the ply and between the plys of fabric. The resin also protects fibers against physical damage from the environment, chemical exposure and chaffing. And finally, the resin reduces the likelihood of crack propagation through the composite by offering greater toughness.

Conventional composite armor attempts to enhance the density of the medium in order to be more resistant to the full impact of a projectile's energy. Typically, composite armor uses the highest tensile strength fiber reinforcement available along with a high resistance to fracture polymer matrix.

Traditionally, the highest tensile strength aramid fabrics have had the pick counts and threads that offered the greatest denier. These high denier, pick count fabrics have been the fabric of choice for composite armor material.

Some high-tensile strength fragment resistant materials tend to deform and slow down a projectile, while other types of high tensile strength ballistic materials, tend to grab and turn a fragment projectile. Typically higher tensile strength materials having lower relative elongation of yield grab at the projectile and tug it toward a side, rather than deforming it as the projectile impacts the material.

The behavior of high tensile strength ballistic material is a function of the materials tensile strength, elongation of yield, and pick count. The tensile strength of the fibers in a ballistic fabric is a leading indicator of that fabric's ability to induce yaw into the path of a projectile. A higher tensile strength gives the fabric a better ability to grab the projectile before yielding to penetration by the projectile than a ballistic fabric with a lower tensile strength. The fabric's grabbing at the projectile before yielding is what induces yaw into the path of the projectile. Yaw is a pivoting motion perpendicular to the direction in which the projectile is traveling.

A fragment undergoing yaw will either roll onto its side or tumble. If the fragment projectile rolls or tumbles, more surface area is exposed to be caught by the armor. The armor typically will have better stopping ability against a projectile with a large area of surface in contact with it, than with a small area of surface in contact with it.

The tensile strength of a ballistic fabric can be increased by increasing the denier of the thread of material used to weave the fabric. Thus, for example, a ballistic fabric with a thread having a denier of about 2000 will have a higher tensile strength than a ballistic fabric made from an identical chemical with a thread having a denier of about 1000.

The elongation of yield of a ballistic fabric is a leading indicator of that fabric's ability to induce deformation into a projectile. When struck by a fragment projectile, a high tensile strength ballistic material with a high pick count and a low elongation of yield will tend to grab at the projectile and turn it to induce yaw, but will not cause much deformation of the projectile. A ballistic material with a higher elongation of yield will tend to hang on to the projectile as the fibers of the material stretch. The stretching of the material allows additional time for the fabric to hang on to the projectile deforming the projectile and slowing it down as fibers elongate, before yielding to penetration.

Strong but brittle fabrics such as, for example, electronic grade fiberglass, which is a calcium aluminoborosilicate glass, or s grade fiberglass, work by delaminating upon impact with the projectile. Fiberglass delaminates more easily than do aramid fabrics. While delaminating, the fiberglass fabric grabs around the sides of the projectile engaging more surface area of the projectile. Electronic (or e) grade fiberglass has an ultimate tensile strength of about 508,000 pounds (force) per square inch when combined with a resin. This tensile strength allows the e grade fiberglass to blunt any sharp edges the fragment may have on its striking surface as it absorbs energy from the impact and slows the velocity of the projectile.

The resin used to form the composite needs to perform several functions. The resin must bond to the fiber reinforcement, and have a high resistance to creep, fatigue, and crack propagation. The resin should enhance the chemical resistance of the fiber and in suitable quantities optimize the delamination of the fibers on impact. A phenolic resin, suitable for use under these conditions is commercially available from Lewcott Corp. of Millbury Mass.

It has been found that by confronting a high-velocity projectile with an alternating series of tougher and softer layers, the tougher layers inducing yaw and the softer layers inducing deformation and slowing down the high-velocity projectile, greater stopping power is achieved over a similar number of layers of either individual material type.

One embodiment of the composite armor confronts a high velocity fragment projectile with several different layers that have different reactions to impact. These different layers present a projectile with an alternating high-tensile strength, high resistance to penetration layer with lower tensile strength lower levels of resistance to penetration layers. The fibers in a lower tensile strength, lower resistance to penetration layer delaminate easily compared to the fibers in a high tensile strength layer. Delamination allows the lower tensile strength layers to grab the sides of a projectile and deform the projectile as it passes through the armor layer.

It should be noted that similar fabric materials with different deniers and pick counts effectively make different material. This is because they will have different mechanical properties. Higher denier generally means that the fiber filament has a larger cross-sectional area, and there is more of the fiber per length of thread. This additional material gives the thread greater tensile strength. Greater tensile strength gives the fabric greater resistance to penetration. Higher pick counts mean there are more threads per area to be struck by the projectile. These additional threads in higher pick count materials add their tensile strength to the resistance to penetration of the fabric.

While materials with similar deniers and pick counts might be thought to have similar stopping power and ballistic abilities, a varying elongation of yield can make these materials respond to ballistic events differently. Thus it is not always possible to base exact ratios of projectile stopping ability based on only denier and pick counts.

One embodiment of the composite armor uses various lay ups of Kevlar™ 29 3000 denier fabrics, electronic grade fiberglass fabrics and a geometric cell core attachment. One of ordinary skill in the art would recognize however that with adequate notice given to denier, pick count and elongation of yield, various materials might be substituted for the fabrics mentioned above. Such substitutions can be, but are not limited to, para aramids such as PBO, Zylon™, various denier Kevlar™ KM2 materials such as 800, 600, 500 or 400 denier material, and Kevlar™ 129 400 denier material. Also, substitutions for the e grade fiberglass may be, but are not limited to, s grade fiberglass. Additionally, with adequate notice given to geometry, various shapes of cells might be substituted in the geometric cell core attachment mentioned above. The basic shape of the geometric cells is a hexagon. However shapes may be substituted for the hexagonal cell. Such substitutions can be, but are not limited to circular, elliptical, triangular, square, rectangular, pentagonal and octagonal.

Reference will now be made to drawings. In the following drawings, like structures are provided with like reference designation. In order to show the structures of the invention more clearly, the drawings included herein are diagrammatic representations of the indicated structures. Thus, the actual appearance of the fabricated structures, for example in a photograph, may appear different while still incorporating the central structures of the invention. Moreover, the drawings show only the structures necessary to understand the invention. Additional structures known in the art have not been included to maintain the clarity of the drawings.

Composite armor panels can be made by combining various layers of aramid fabrics, polyethylene fabrics, and fiberglass fabrics and setting up these layers in a resin. Setting up the layers in a resin as used herein means the resin permeates the layers of fabric. Permeation of the layers of fabric means that the resin is on and between the threads of a given fabric, and on and between the different plys and layers of fabric. These set up layers of fabrics are then attached to either side of a geometric cell core attachment. In one embodiment, the composite armor weighs less than 3.3 pounds per square foot of protected area, is less than 1.3 inches in thickness, and exceeds requirements of the American Society, for Testing and Materials F 1233-93 class III sequence 16 standard for forced entry.

FIG. 1 is a top down cut away schematic view of one embodiment of a composite armor panel. The composite armor is a combination of layers designed to alternately cause deformation to a ballistic projectile and to induce yaw to the path of the projectile. The panel also provides a small amount of flex and elastic deformation that absorbs and dissipates the energy from a forced entry attack over an area that is larger than the area that is directly attacked. The first layer 102, which is the layer closest to the viewer, is partially cut away in the lower right hand corner to reveal layer 103 which is covered by layer 102. Layer 103 is partially cut away to reveal layer 104 which layer 103 covers. This continues to layer 108 which is the bottom most layer in FIG. 1. The first layer 102 of the composite armor 100 as shown in FIG. 1 may be a high tensile strength ballistic fiber fabric. In one embodiment, first layer 102 may be eight plys of Kevlar™ 29 3000 denier aramid fabric with a pick count of about 23×23 to about 26×26. In one embodiment, this layer uses less than 10 plys of an aramid fabric having a denier of greater than 2000, a pick count of less than 40×40, and a resin content of less than about 30 percent saturation. This layer tends to induce yaw into a projectile/fragment contacting it, because of the high tensile strength and low elongation of yield of the thread of this fabric. This layer may have a thermoset phenolic resin content of about 14.5 to about 28 percent resin saturation.

In FIG. 1, second layer 103 of composite armor 100 as shown in FIG. 1 is a high tensile strength brittle ballistic fiber fabric. This layer being hard and brittle tends to blunt any sharp edges the fragment may have on its striking surface. In one embodiment, second layer 103 is two plys of electronic grade fiberglass (e-glass) fabric with a pick count of about 54×54 to about 58×58. This layer may have a thermoset phenolic resin content of about 35 to about 44 percent resin saturation. In one embodiment, the second layer uses less than five plys of fiberglass having an ultimate tensile strength of about 3000 Mpa. a pick count of less than 60×60 and a resin content of less than about 45 percent saturation. In one embodiment, the resin has a flexural strength of at least 77,000 psi, a flexural modulus of at least 3,950,000 psi, a tensile strength of at least 53,000 psi, a compressive strength of at least 61,500 psi and a Barcol hardness of at least 84.

The fabric in the first and second layers 102 and 103 of one embodiment may have a variety of weaves. If the composite armor is to be a flat sheet, a plain weave of the fabric will be appropriate. A plain weave is where the fibers of the fabric are woven over one under one over one etc. in both directions. If however, a shape or some curve is desired in the composite armor, alternate weaves are better to accommodate the change in shape of the armor. For example, an eight-harness satin weave will make the fabric a little more pliable and better enable it to conform to a shape with a curve. An eight-harness satin weave is where the fibers are threaded over seven under one in both directions.

Third layer 104 in FIG. 1, in one embodiment, can be one ply of an aramid fiber paper sheet. Aramid fiber paper sheets are manufactured by combining aramid fibers that have been cut into suitable lengths and a binder. The fibers and binder are then pressed into paper. The aramid fiber paper sheet may be made of Nomex® or Korex®. Nomex® and Korex® are examples of aramid fiber paper that are available from E.I. du Pont de Nemours and Company of Wilmington, De. The aramid fiber paper sheet caps one end of the geometric cell core attachment of central layer 105 of panel 100. Depending on the requirements of the panel fabricated the aramid fiber sheet may be coated in a phenolic or polyimide resin. In other embodiments, layer 104 may be fabricated from aluminum or carbon materials.

A fourth layer 105, in one embodiment, is a layer of closely packed geometric cells. In one embodiment, the geometric cells are cylindrical. These cylinders have a geometric shape of a circle which is extended to form a tube or cylindrical shell. This embodiment of the geometric cell has a length which is the length of the tube and a diameter which is the diameter of the circular geometric shape. In other embodiments, the diameter is that of a circle that is inscribed by the geometric shape. That is, each side of the geometric shape is tangent to the circle. Geometric cells 105 have a longitudinal axis oriented normal to the plane in which the panel lies and parallel to the length of the cell. In one embodiment, cells 105 have a length of about 0.750 inches, and a diameter of about 0.125 inches. Cells 105 may be fabricated from aramid fiber paper such as Nomex® or Korex®. Cells 105 may be, in one embodiment, coated in a phenolic or polyimide resin. Cells 105 in FIG. 1 are hexagons, but they may be, among other shapes, circles, ovals triangles, squares, rectangles, pentagons and octagons. Cells 105 provide strength and flexibility to the composite armor panels. In the event of a forced entry attack using a sharp or blunt object, cell layer 105 may flex allowing the distribution and dissipation of energy of the attack across the panel. In other embodiments, layer 105 may be fabricated from aluminum or carbon materials.

In one embodiment, a fifth layer 106 can be one ply of an aramid fiber paper sheet. The aramid fiber paper sheet may be made of Nomex® or Korex®. The aramid fiber sheet caps the other end of the geometric cell core attachment of the central layer of the panel. Depending on the requirements of the panel fabricated the aramid fiber sheet may be coated in a phenolic or polyimide resin.

Aramid fiber paper sheets 104 and 106 cap the ends of the geometric cells in layer 105. By capping the cells of layer 105, layers 104 and 106 enhance the structural stability of the geometric cells, and provide greater surface area for bonding to layers 103 and 107. In one embodiment, layers 104, 105 and 106 are commercially available in a hexagonal configuration from Hexcel Corporation of Pleasanton, Calif. The hexagonal configuration has layers 104 and 106 adhered to layer 105 with a phenolic resin impregnated in all three layers.

In one embodiment, a sixth layer 107 of composite armor 100 as shown in FIG. 1 is a high tensile strength brittle ballistic fiber fabric. This layer is hard and brittle, and tends to blunt any sharp edges the fragment may have on its striking surface. In one embodiment, sixth layer 107 is two plys of electronic grade fiberglass (e-glass) fabric with a pick count of about 54×54 to about 58×58. This layer may have a thermoset phenolic resin content of about 35 to about 44 percent resin saturation.

Seventh layer 108 of the composite armor 100 as shown in FIG. 1 is a high tensile strength ballistic fiber fabric. In one embodiment, seventh layer 108 may be eight plys of Kevlar™ 29 3000 denier aramid fabric with a pick count of about 23×23 to about 26×26. This layer tends to induce yaw into a fragment contacting it, because of the high tensile strength and low elongation of yield of the thread of this fabric. This layer may have a thermoset phenolic resin content of about 14.5 to about 28 percent resin saturation.

While as described, the composite armor is symmetric about the central core 105, it is within the scope and contemplation of the invention to introduce asymmetries into the composite armor. For example layers 103 and 107 may in one embodiment have different number of plys.

Suffused throughout the various layers of fabric in FIG. 1 is at least one resin. The resin transfers force from one layer to another when an individual ply fails. The resin also produces a certain resistance to impact yet allows enough flexibility and delamination during impact to not retard elongation of the ballistic fabrics that the resin impregnates.

The two types of resins used in manufacturing composite armor are thermosets and thermoplastics. Thermosets will change chemical composition when heated, so they provide one chance to form the shape of the object. Thermoplastics do not require a lot of chemical reaction to take place on heating up so they may be cycled many times. Thermoplastics are good for moisture barriers because they are non-hydroscopic, but solvents can affect them. Thermoset resins tend to provide good resistance to chemical attack, but do not provide good protection against moisture.

In one embodiment the resin is a phenolic resin commercially available from Lewcott Corp. of Millbury, Mass. In one embodiment, the phenolic resin has a flexural strength of about 79,000 pounds per square inch (PSI), a flexural modulus of about 4,100,000 PSI, a tensile strength of about 55,600 PSI, and a Barcol hardness of 84. The resin binds all layers and plys of fabric together with center composite geometric cell core 105.

Figure 2:
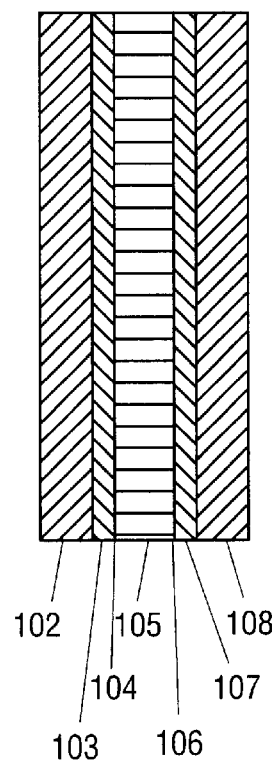
FIG. 2 is a cross-sectional schematic side view of one embodiment of the composite armor.

FIG. 2 is a cut away side schematic view of one embodiment of the composite armor panel. In the center of FIG. 2 is a layer of closely packed geometric cells 105. Layer 105 provides structure to the composite armor panel, and flexibility as well. Layer 105 is able to elastically deform on impact during forced entry attack. This elastic deformation allows layer 105 to absorb and dissipate the energy of a forced entry attack over a larger area than is directly attacked. Layer 105 may be coated in a phenolic or polyimide resin.

In one embodiment, layer 105 of FIG. 2 is clad on either side with a single ply of aramid fiber paper 104, 106. Layers 104 and 106 may be coated in a phenolic or polyimide resin to match the resin applied to layer 105. In one embodiment, the sides of layers 104 and 106 opposite to layer 105 of FIG. 2 are each clad respectively in a layer 103 and 107 of a fiberglass ballistic grade textile fabric. Finally layers 102 and 108 are seen on the outside of layers 103 and 107. Layers 102 and 108 are a high tensile strength ballistic fiber fabric.

In one embodiment, composite armor panel 100 acts as a single membrane in much the same way as a drumhead works. The fabric layers are equally balanced on either side of closely packed geometric cell layer 105. Equally balancing the amount and type of fabric layers covering closely packed geometric cell layer 105 allows the fiber layers and cell layer to complement the structural advantages of each other. The drumhead response of the composite armor panel allows the panel to flex, absorbing and attenuating the energy of a forced entry attack through elastic deformation, and return to its original configuration.

Figure 3:
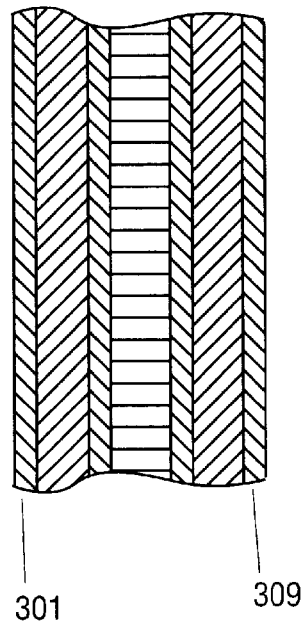
FIG. 3 is a cross-sectional schematic side view of one embodiment of the composite armor.

FIG. 3 is a cut away side schematic side view of one embodiment of composite armor panel 120. In one embodiment, this configuration is for use in marine environments, and therefore has a water tight sealant encasing the armor panel. FIG. 3 is an illustration of FIG. 2 with the addition of layers 301 and 309 placed on the outside of composite armor panel 100. Layers 301 and 309 may comprise a single ply of fiberglass ballistic grade textile fabric. Layers 301 and 309 may have a phenolic resin content of about 35 to about 44 percent. Layers 301 and 309 may have applied to their exterior surfaces a layer of gelcote. In one embodiment, Bondo® marine sealant may be used as the gelcote. Bondo® is available from Bondo Mar-hyde Corporation of Atlanta Ga. The resin composition that is blended in with fiberglass material with low porosity allows a seamless integration of armor to a hull or bulkhead assembly. Layers 301 and 309 allow the formation of a water tight enclosure surrounding composite armor panel 120.

Figure 4:
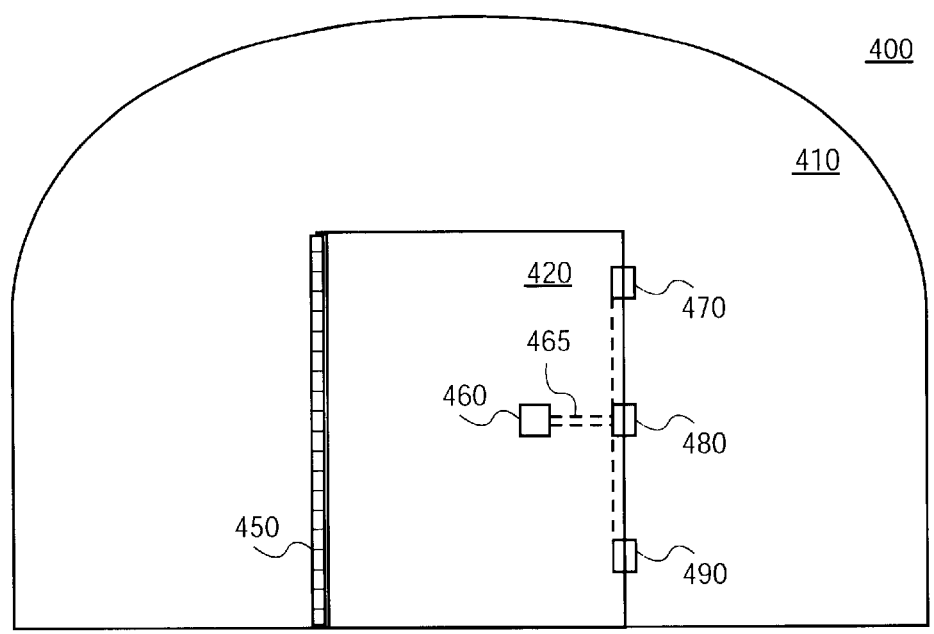
FIG. 4 is a schematic view of one embodiment of the composite armor.

FIG. 4 is a front view schematic illustration of one embodiment of the composite armor used as a cockpit door. Cockpit door assembly 400 is illustrated in FIG. 4. Cockpit door assembly 400 is attached to cockpit bulkhead 410. Cockpit bulkhead 410 in one embodiment, separates the cockpit from the passenger cabin of a commercial airline. Cockpit door 420 is attached to cockpit bulkhead 410 through a full height continuous hinge 450. Hinge 450 runs the length of one side of door 420 to give the connection a greater amount of strength. Locking mechanism and latch 460 is placed in the interior of door 420. Locking mechanism 460 connects to at least one locking point on the opening end of door 420. In one embodiment, door 420 has three locking points, 470, 480 and 490. Locking points 470, 480 and 490 are spaced along the opening edge of door 420 in such a manner as to give the locked door greater resistance to attack than a door with a single locking point. Locking mechanism and latch 460 may attach directly to each of the locking points or may attach directly to only one locking point and actuate the other locking mechanisms through that locking point. In FIG. 4, locking mechanism and latch 460 connects to locking point 480 directly and indirectly to locking points 470 and 490 through opening mechanism 465. In one embodiment, locking mechanism and latch 460, opening mechanism 465 and locking points 470, 480 and 490 may be contained within layer 105 (shown in FIGS. 1 and 2) of composite armor door 420. In another embodiment, locking points 470, 480 and 490 may be on the outside of composite armor door 420.

Figure 5:
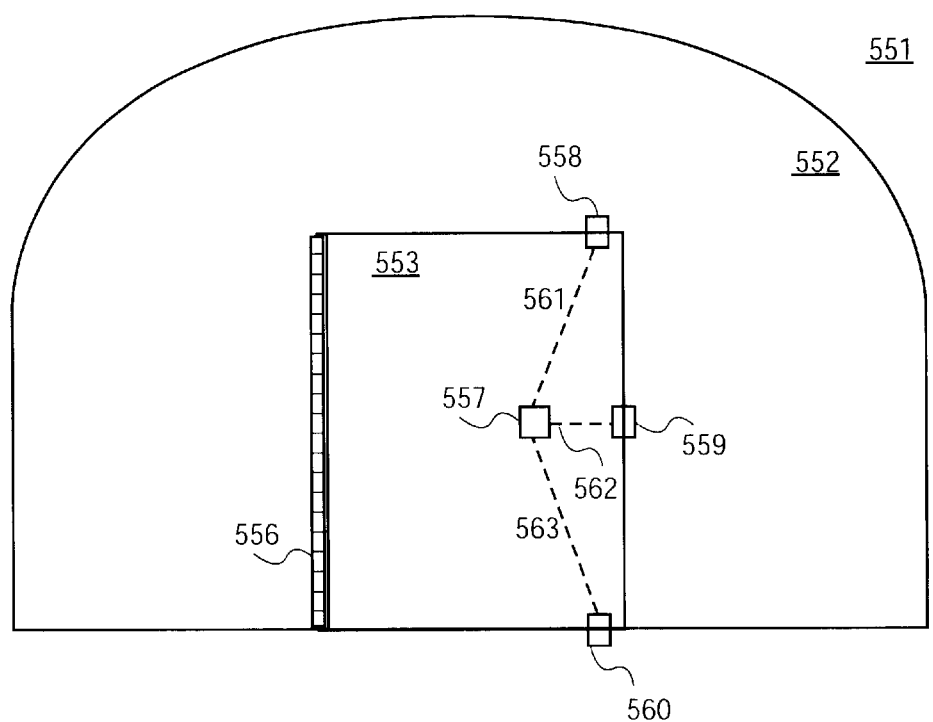
FIG. 5 is a schematic view of one embodiment of the composite armor.

FIG. 5 is a front view schematic illustration of one embodiment of the composite armor used as a cockpit door. Cockpit door assembly 551 is attached to cockpit bulkhead 552. Cockpit bulkhead 552 in one embodiment, separates the cockpit from the passenger cabin of a commercial airline. Cockpit door 553 is attached to cockpit bulkhead 552 through a full height continuous hinge 556. Hinge 556 runs the length of one side of door 553 to give the connection a greater amount of strength. Locking mechanism and latch 557 is placed in the interior of door 553. Locking mechanism 557 connects to at least one locking point on the opening end of door 553. In one embodiment, door 553 has three locking points, 558, 559 and 560. Locking points 558, 559 and 560 are spaced along the edges of door 553 in such a manner as to give the locked door greater resistance to attack than a door with a single locking point. Locking point 558 is attached towards the strike edge of the top of door 553. Locking point 559 is attached to the center of the opening side of door 553. Locking point 560 is attached towards the strike edge of the bottom of door 553. Locking mechanism and latch 557 may attach directly to each of the locking points through opening mechanisms 561, 562 and 563.

It is to be understood that in one embodiment, opening mechanism 465 of FIG. 4 may be found in the embodiment of FIG. 5. In another embodiment, opening mechanism 561, 562 and 563 of FIG. 5 may be found in the embodiment of FIG. 4. Opening mechanisms 465 and 561, 562 and 563 are thus interchangeable.

FIG. 6 is a flow diagram representing one method of fabricating the composite armor panel of FIG. 1. The plurality of layers 102, 103, 107 and 108 of plys of ballistic grade fabric placed around core layer 105 may be laid up in a mold and introduced into an autoclave. This mold can take the form of flat sheets or have various edges and surfaces to shape the layers of fabric by the mold.

In one embodiment the method begins at block 610 by providing a center layer of a panel having a plurality of closely packed geometric cells of a first material wherein a major axis of the cells is normal to a plane in which the first layer lies the layer impregnated with a resin. At block 620 the center layer is encased in a first fabric layer having a plurality of plys of a first fabric in a balanced manner so there are a equal number of plys of the first fabric on the front and back of the center layer. The fabric is impregnated with a resin. The center layer and the first fabric layers are encased in a second fabric layer having a plurality of plys of a second fabric being different from the first fabric in a balanced manner so there are an equal number of plys of the second fabric on the front and back of the center layer at block 630. The second fabric layer is impregnated with a resin. At block 640 the panel formed from the center layer and the two encasing layers of fabrics are placed into a mold. The mold is placed in an autoclave heating and pressurizing the panel until the resin turns into a low viscosity liquid combining with the ply above it and below it and forming a bond between the plurality of plys and the center layer and sealing the panel from the environment at block 650.

Bonding with the above and below layers of fabric is important in that it enables the composite armor to transfer energy of impact between fibers within a single fabric layer, but when an individual fiber layer's ability to absorb energy is exceeded, the resin can then transfer energy between layers of fabric. Once the resin is held at temperature for sufficient time, it "gels" and becomes a hard catalyzed finished product. When the resin has had sufficient time to combine with the plys of the composite armor the mold is removed from the autoclave.

In another embodiment, the resin can be absorbed in to the layers of fabric by a Vacuum Assisted Resin Transfer Method (VARTM). All of the various plys are counted up and center layer 105 is placed between them in a balanced manner. The panel is then placed into a vacuum controlled bag that is put into an autoclave rather than running through sticky tape and then a press. As the resin is injected into the material, the vacuum pulls on it, helping pull the resin through the material from one end to the other. Then the lay up is run through the autoclave sequence. The pressure and temperature of this operation depends on the type and viscosity of resin used. The pressure and temperature is selected to be appropriate for the resin. Temperature is a critical issue when trying to pull resin through the lay up especially when there are various densities of materials.

Trapped pockets or voids may occur in the lay up when the resin doesn't permeate the layers adequately. The resin might not flow into all areas of the lay up if the temperature is not appropriate for the resin used.

In another embodiment, the resin can be absorbed into the layers of fabric by a Co-Injection Resin Transfer Molding (CIRTM) method, which may use more than one type of resin. Phenolic vinyl esters can mix and match different resins to get better mechanical properties than an individual resin has. High fixed costs are associated with the use of CIRTM, however, with sufficient volume CITRM becomes cost effective.

With CIRTM, the weight of the composite could be reduced still further. Weight can be reduced by using lighter weight resins on interior layers that don't come in contact with the outside environment and therefore do not require water resistance. Weight can be dropped by using vinyl ester or other type of adhesive on interior layers and using a phenolic resin later on an overall coating cap for overall heat and chemical resistance. This combination of resins may have a lighter weight because the density of the vinyl ester resin is not as great as that of the phenolic resin. CIRTM injects resins side-by-side so they don't mix. A cross section of the composite armor would have the different resins staying within their intended layers of fabric.

Thus while multiple methods for forming the composite armor may be used, they each have their own advantages and disadvantages. Co-Injection Resin Transfer Molding can use multiple types of resins. The Vacuum Assisted Resin Transfer Method is generally a single resin system, and sticky tape is a single resin absorption process. Vacuum Assisted Resin Transfer Method can do a group of layers at a time but only one type of resin at a time. Co-Injection Resin Transfer Molding allows using multiple types of resin put into each of the plys at once. Co-injection is five times more expensive than Vacuum Assisted Resin Transfer Method, but if multiple resins are required in the lay up the expense may be justified.

As described above, one measure of the stopping ability of a composite armor is the National Institute of Justice Level III-A. One embodiment of the composite armor exceeds Level III-A. As described above, the National Institute of Justice (NIJ) Level III-A standard is a uniform system of calibrating hand gun threats, and the ability of armor to defeat these threats.

Also as described above, the American Society for Testing and Materials (ASTM) has adopted a set of standards for calibrating resistance to forced entry attacks. The standard is called ASTM 1233-93. One embodiment of the composite armor exceeds ASTM 1233-93 class III sequence 16.

One embodiment of the composite armor panel is impervious to the overpressure and fragmentation effects of a United States M-67 fragmentation grenade detonated three feet from the armor panel. Maximum heat release and smoke density standards have been established by the Ohio State University (OSU). One embodiment of the composite armor exceeds the requirements of "OSU 65/65 200." Federal Aviation Regulation (FAR 25.853) establishes standards for flame resistance of materials to be placed in airline cabin and cargo compartments. One embodiment of the composite armor exceeds the requirements of FAR 25.853.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

What is claimed is:

1. A composite armor comprising:
   a first layer comprising a plurality of closely packed geometric cells of a first material wherein a major axis of the cells is normal to a plane in which the first layer lies, the first layer impregnated with a resin;
   a second and third layer each having a substantially equal plurality of plys of a second material impregnated with a resin, the second layer coupled to a front side of the first layer and the third layer coupled to a back side of the first layer;
   a fourth and fifth layer each having a substantially equal plurality of plys of a third material coupled to opposing sides of the first layer, the fourth and fifth layers impregnated with a resin;
   wherein the composite armor weighs less than 3.3 pounds per square foot of protected area, is less than 1.3 inches in thickness, and exceeds requirements of the American Society for Testing and Materials F 1233-93 class III sequence 16 standard for forced entry.

2. The composite armor of claim 1, wherein a shape of the geometric cells comprise one of circular, oval, triangular, square, rectangular, pentagonal, hexagonal and octagonal.

3. The composite armor of claim 1, wherein the armor exceeds requirements of the National Institute for Justice level III-A ballistic penetration standard.

4. The composite armor of claim 1, wherein the armor exceeds requirements of the Ohio State University OSU 65/65 200 standard for heat release and smoke density.

5. The composite armor of claim 1, wherein the armor exceeds requirements of the Federal Aviation Regulation 25.853 sixty second vertical burn standard.

6. The composite armor of claim 1, wherein the second layer comprises a fabric.

7. The composite armor of claim 1, wherein the fourth layer comprises a ballistic fabric.

8. The composite armor of claim 1, comprising a phenolic resin impregnated throughout the second and third layers.

9. The composite armor of claim 8, wherein the resin has a flexural strength of at least 77,000 psi, a flexural modulus of at least 3,950,000 psi, a tensile strength of at least 53,000 psi, a compressive strength of at least 61,500 psi and a Barcol hardness of at least 84.

10. The composite armor of claim 1, wherein the second and third layers provide flexural rigidity against forced entry attack.

11. The composite armor of claim 1, wherein the first layer provides energy absorption and dissipation through elastic deformation against forced entry attack.

12. The composite armor of claim 1, wherein the fourth layer comprises a third material that acts to slow and grab a ballistic projectile.

13. The composite armor of claim 12, wherein the fourth layer comprises less than 10 plys of an aramid fabric having a denier of greater than 2000, a pick count of less than 40×40, and a resin content of less than about 30 percent saturation.

14. The composite armor of claim 1, wherein the second layer comprises a second material that acts to slow and deform a ballistic projectile.

15. The composite armor of claim 14, wherein the second layer comprises less than five plys of fiberglass having an ultimate tensile strength of about 3000 MPa, a pick count of less than 60×60 and a resin content of less than about 45 percent saturation.

16. The composite armor of claim 1, wherein the resin impregnated in the second layer is different from the resin impregnated in the fourth layer.

17. The composite armor of claim 1, further comprising:
a sixth and seventh layer each having at least one ply of a fourth material coupled to the front and back of the armor over the first layer, the sixth and seventh layers each impregnated with a resin.

18. The composite armor of claim 1, further comprising:
a door for an airplane cockpit formed from at least one panel of the composite armor wherein the door has a locking mechanism, at least one opening mechanism and at least one locking point coupled to the door.

19. The composite armor of claim 18, wherein the locking mechanism comprises three mechanisms spaced along a vertical opening side of a door.

20. The composite armor of claim 18, wherein the locking mechanism comprises three mechanisms spaced along an opening side of a door the door having a hinged edge, a top edge, an opening edge and a bottom edge, a first locking mechanism located along a portion of the top edge of the door, a second locking mechanism located near a center portion of the opening edge of the door and a third locking mechanism located along a portion of the bottom edge of the door.

21. A composite armor comprising:
a first layer of fabric,
a second layer of fabric coupled to the first layer being different than the first layer,
a third layer having a plurality of closely packed geometric cells of a first material wherein a major axis of the cells is normal to a plane in which the first layer lies, the third layer impregnated with a resin and coupled to the second layer,
a fourth layer of fabric coupled to the third layer,
a fifth layer of fabric coupled to the fourth layer being different than the fourth layer,
wherein the fabric layers provide flexural rigidity to the armor and combine with an ability to flex and absorb and dissipate energy from a forced entry attack provided by the third layer and the composite armor weights less than 3.3 pounds per square foot of protected area, is less than 1.3 inches in thickness, exceeds the requirements of American Society for Testing and Materials F 1233-93 class III sequence 16 standard for forced entry.

22. The composite armor of claim 21, wherein a shape of the geometric cells comprise one of circular, oval, triangular, square, rectangular, pentagonal, hexagonal and octagonal.

23. The composite armor of claim 21, wherein the armor exceeds requirements of the National Institute for Justice level III-A ballistic penetration standard.

24. The composite armor of claim 21, wherein the armor exceeds requirements of the Ohio State University OSU 65/65 200 standard for heat release and smoke density.

25. The composite armor of claim 21, wherein the armor exceeds requirements of the Federal Aviation Regulation 25.853 sixty second vertical burn standard.

26. The composite armor of claim 21, wherein;
a first material is used for the third layer of closely packed geometric cells,
a second material is used for the second and fourth layers, and a third material is used for the first and fifth layers.

27. The composite armor of claim 26, wherein the first material comprises a plurality of fiber fabric closely packed composite geometric cells impregnated with a resin.

28. The composite armor of claim 27, wherein the first material tends to flex allowing the absorption and dissipation of energy from a forced entry attack.

29. The composite armor of claim 26, wherein the second material comprises less than five plys of a fiberglass having a ultimate tensile strength of about 3000 MPa, a pick count of less than approximately 60×60 and a resin content of less than about 45 percent saturation.

30. The composite armor of claim 29, wherein the second material tends to delaminate and grab onto the sides of a ballistic projectile impacting it.

31. The composite armor of claim 26, wherein the third material comprises less than ten plys of an aramid ballistic grade fabric having a denier of greater than approximately 2000, a pick count of less than approximately 40×40 and a resin content of less than about 30 percent saturation.

32. The composite armor of claim 31, wherein the third material tends to stop and induce yaw into a ballistic projectile impacting it.

33. A method of making a composite armor panel comprising:
providing a center layer of a panel having a plurality of closely packed hexagonal cells of a first material wherein a major axis of the cells is normal to a plane in which the first layer lies, the layer impregnated with a resin,
encasing the center layer in a first fabric layer having a plurality of plys of a first fabric in a balanced manner so there are a substantially equal number of plys of the first fabric on the front and back of the center layer, the fabric impregnated with a resin,
encasing the combination of the center layer and the first fabric layer in a second fabric layer having a plurality of plys of a second fabric being different from the first fabric in a balanced manner so there are a substantially equal number of plys of the second fabric on the front and back of the center layer, the second fabric impregnated with a resin,
placing the panel into a mold,
placing the mold in an autoclave and heating and pressurizing the panel until the resin turns into a low viscosity liquid combining with the ply above and below it and forming a bond between the plurality of plys and the center layer and sealing the panel from the environment.

34. The method of claim 33, wherein each of the first fabric layers comprise a plurality of plys not exceeding five plys each.

35. The method of claim 33, wherein each of the second fabric layers comprise a plurality of plys not exceeding ten plys each.

36. The method of claim 33 further comprising:
placing a layer of sticky tape coated with resin next to a ply of fabric and running the fabric and sticky tape through a hot roller press.

37. The method of claim 33 further comprising:
using a vacuum gradient to assist the resin in diffusing through the layers of fabric by pulling the resin through the fabric layers.

38. The method of claim 33 further comprising:
co-injecting the resin into a side of a mold forcing the resin to run the length of the mold.

* * * * *